Feb. 25, 1964     W. J. HITCHCOCK     3,122,642
INFRA-RED IMAGING MEANS USING A MAGNETIC FILM DETECTOR
Filed July 5, 1961     2 Sheets-Sheet 1

INVENTOR.
WILLIAM J. HITCHCOCK
BY
ATTORNEYS

Feb. 25, 1964 W. J. HITCHCOCK 3,122,642
INFRA-RED IMAGING MEANS USING A MAGNETIC FILM DETECTOR
Filed July 5, 1961 2 Sheets-Sheet 2

INVENTOR.
WILLIAM J. HITCHCOCK
BY Wade Loomis
Sherman H. Goldman
ATTORNEYS

' # United States Patent Office 3,122,642
Patented Feb. 25, 1964

1

3,122,642
INFRA-RED IMAGING MEANS USING A
MAGNETIC FILM DETECTOR
William J. Hitchcock, 164 Main St., Kingston, Mass.
Filed July 5, 1961, Ser. No. 122,041
8 Claims. (Cl. 250—83.3)
(Granted under Title 35, U.S. Code (1952), sec. 266)

The invention described herein may be manufactured and used by or for the United States Government for governmental purposes without payment to me of any royalty thereon.

This invention relates generally to image transducers and more particularly to one which is capable of being utilized for infra-red radiation detection.

The apparatus and method of this invention has utility for quickly and accurately locating a dim hot body in an extensive field of view and is capable of utilizing wavelengths longer than the 14,000 angstroms. In addition, the device may be utilized for the measurement of furnace or other high temperatures. With the advent of high speed, high altitude missiles an accurate infra-red detector would be valuable for detection of said missiles and also to guide other missiles such as anti-missile missiles.

The apparatus of this invention comprises an optical system, a filter capable of excluding passage of substantially all light except that in the desired infra-red region, and a ferromagnetic film conducting the flux of a permanent magnet between whose poles it is placed. The filters which may, for example, be of amorphous selenium should be thermostated such that it is at a temperature to control the wave lengths at which the selenium will operate as a filter. The infra-red image which passes through the filter is focussed onto the ferromagnetic material which is also thermostated at the point where the flux of the fixed magnet through said material varies rapidly with temperature change, i.e., close to the curie point. The ferromagnetic film is in a vacuum to allow of free motion of electrons in its vicinity and reduce heat loss from those points warmed by the image. At this point various methods may be used to indicate the presence of the infra-red energy. One embodiment presented utilizes a coating on the ferromagnetic material of a thermionic emitter thereby producing electrons, magnetically modulated at their source, which may be controlled by conventional grids and amplifiers to a sensing means in a well known manner. Another embodiment would utilize the principles of the image orthicon for producing a picture of the infra-red pattern which was presented to the ferromagnetic material usually in such a form as to actuate guiding mechanisms or to present a picture. In a further embodiment a bridge circuit which utilizes the magnetic flux through the legs of a transformer may be unbalanced by the application of heat or infra-red energy to a portion of the ferromagnetic material and be used as an infra-red detector or temperature measuring device.

The apparatus and method, therefore, is capable of translating a light picture into a magnetic one whereby infra-red radiation may be graphically presented, or it may be turned into the equivalent of the infra-red picture in terms of electronic currents.

Accordingly, it is an object of this invention to provide a novel infra-red radiation detector.

2

It is another object of this invention to provide a radiation detector which is responsive to the hottest point in a field of view.

It is still another object of this invention to provide an infra-red radiation detector which translates a light picture into a magnetic one.

It is a still further object of this invention to provide an infra-red radiation detector having a very wide angular field of view at one time.

Another object of this invention involves a method of translating a light picture into an electron picture by upsetting the normal uniform flow of electrons from the magnetic film by producing a variation in a magnetic field external to it which is responsive to temperature and, therefore, magnetically modulates the electron flow. These electrons may be either thermionically emitted from the film or emitted at an electron gun scanning the film.

These and other advantages, features and objects of the invention will become more apparent from the following description taken in connection with the illustrative embodiments in the accompanying drawings, wherein.

Figure 1:
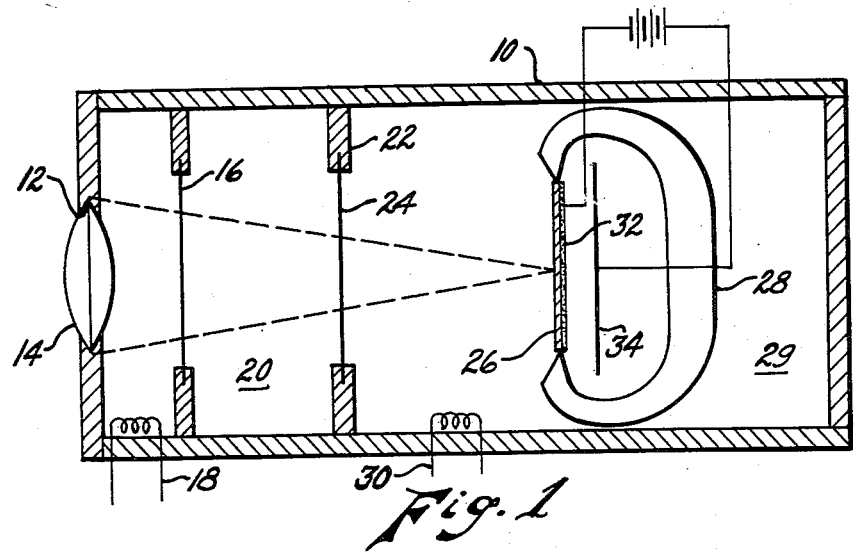
FIGURE 1 is a schematic representation of one embodiment of this invention which utilizes thermionic emission for sensing an infra-red picture on a ferromagnetic material.

Referring to FIGURE 1 of the drawings, 10 represents a container for an infra-red detector and has a hole 12 in which is mounted a lens 14 or a Schmidt system to allow for passage of light therethrough. A sheet of amorphous selenium 16 is utilized to filter out all light in the visible spectrum while still allowing the passage of infra-red energy into container 10 through lens 14. Although amorphous selenium is specified as the filter, it should be understood that germanium and silicon or organic films may be substituted therefor without departing from the scope of the invention. The amorphous selenium sheet 16 is thermostated as shown by the schematic representation of a heating coil 18 in the enclosure 20 formed by the front and sides of container 10 and wall 22 which includes a portion 24 of the amorphous selenium or other infra-red passing material in order to maintain the sheet 16 at a constant temperature thereby controlling the wave length filtering properties of the filter material. It should be understood that although the presentation in FIGURE 1 shows the filter material placed behind the lens system, it may also be placed before the lens system without adversely affecting the operation of the device. In fact, an improvement in properties results.

The infra-red energy having passed through both the lens system and the filters 16 and 24 is preferably focussed onto a uniformly thin portion of a sheet of ferromagnetic material 26 which usually has a greater permeability than a vacuum and which varies its magnetic properties with respect to temperature. A fixed magnet 28 is placed such that its pole pieces are at opposite edges of the ferromagnetic sheet 26. An enclosure 29 surrounds the ferromagnetic material 26 and is thermostated by heating coil 30 at the point where the flux of the magnet 28 through any point on the ferromagnetic material varies most rapidly with temperature change. Both positive and negative reactions to heat may be achieved by utilizing various ferromagnetic materials, that is, a temperature rise may be used to either reach saturation or reduce saturation in accordance with properties of the materials. The infra-red picture which is presented to the ferromagnetic material 26 creates local temperature changes dependent upon the intensity of the image. This produces a variation in magnetic properties at these points which may be sensed in adjacent regions to reproduce the light picture which has now been translated into a magnetic one. The chamber 29 is evacuated by a conventional vacuum pump (not shown) during operation of the device.

One method of sensing the magnetic change is shown in FIGURE 1 whereby a thermionic emitter 32 is coated on the ferromagnetic sheet 26 such that the temperature at which the sheet 26 is thermostated plus the local infra-red heating produces a greater local emission of electrons. Examples of a material suitable for ferromagnetic material 26 would be permalloy while the coating 32 thereon might be a caesium on oxygen emission material. This caesium on oxygen layer would be similar to that of phototubes. An example of a material which is ferromagnetically ordered above the transition temperature and antiferromagnetically ordered below is $Mn_{2-x}Cr_xSb$. This material would produce the opposite (light and dark areas) of the particular picture presented by permalloy. This might be especially useful in the form of the device shown in FIGURE 3.

The action of the infra-red energy on the permalloy ferromagnetic sheet 26, by creating a change in temperature thereon, produces a change in the magnetic flux at the points which are heated by said energy. This picture produces a deflection of the emitted electrons from the emitter 32 such that when, with proper amplification and acceleration by conventional means, the emitted electrons activate a fluorescent screen 34 or other device such that a picture or other representation of the infrared energy is available. This may be in the form of an electron current as in television.

The detecting apparatus of FIGURE 1 may utilize the principle of the image orthicon to present the infra-red image. An image orthicon such as that described in Television Engineering Handbook by Donald Fink, published by McGraw Hill in 1957, may be modified by substituting the photo-emissive cathode with the thermostated filter behind which is placed a sheet of material such as gadolinium, which is similar to permalloy but doesn't allow much thermionic self emission. The gadolinium has the flux from a permanent magnet flowing therethrough as described relative to FIGURE 1. In this application the electrons emitted from the emissive material coated on the ferromagnetic sheet would be accelerated by grids toward a target mesh assembly which operates in the manner described in the afore-mentioned book.

Figure 2:
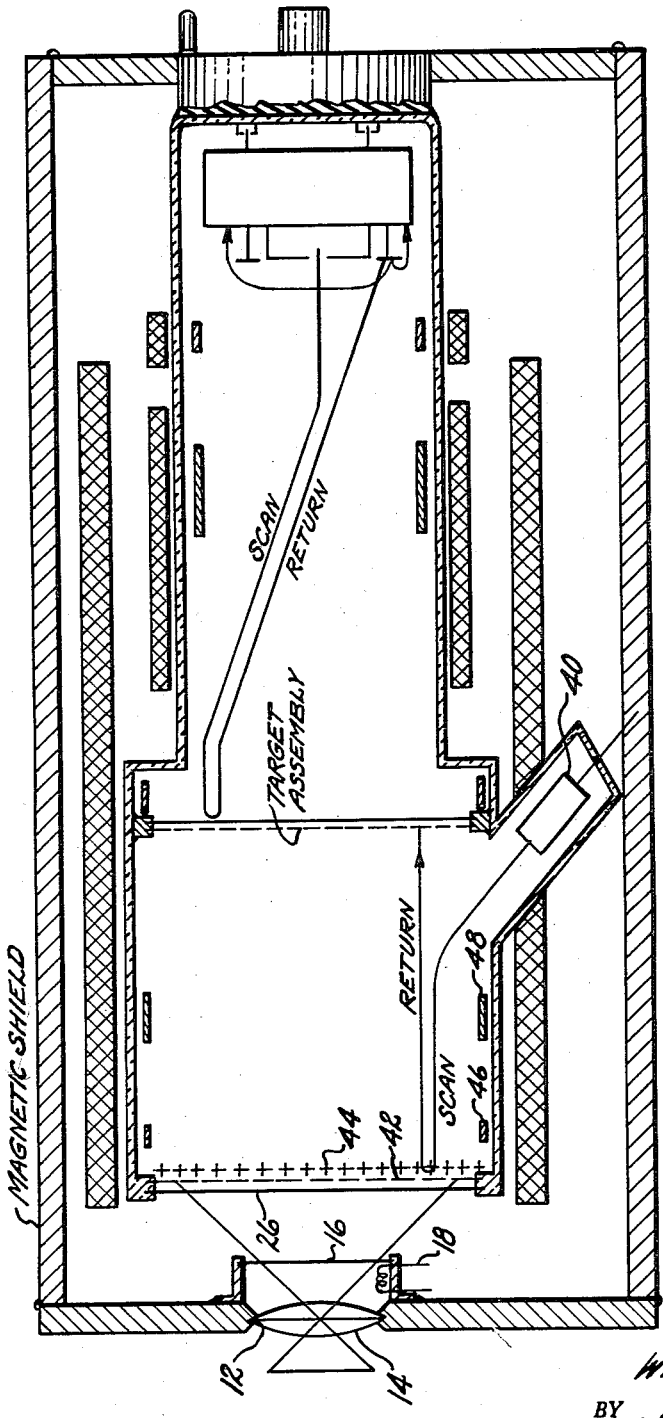
FIGURE 2 is a schematic representation of an infra-red detector utilizing an image orthicon as a sensing means.

FIGURE 2 utilizes the principle of the image orthicon; however, the emissive coating on the ferromagnetic material, previously described, is eliminated by adding an auxiliary electron gun 40 which provides a scanning beam to approach the permalloy sheet 26 and be reflected to the target mesh. A grid 42 is provided for slowing down the auxiliary scan electrons while a slat grid 44 and accelerating grids 46, 48 accelerate the return electrons. The electron pattern presented to the target assembly would be altered by the magnetic effect of the permalloy on the scanning beam directed toward it. The remainder of the device acts as a conventional image orthicon.

Figure 3:
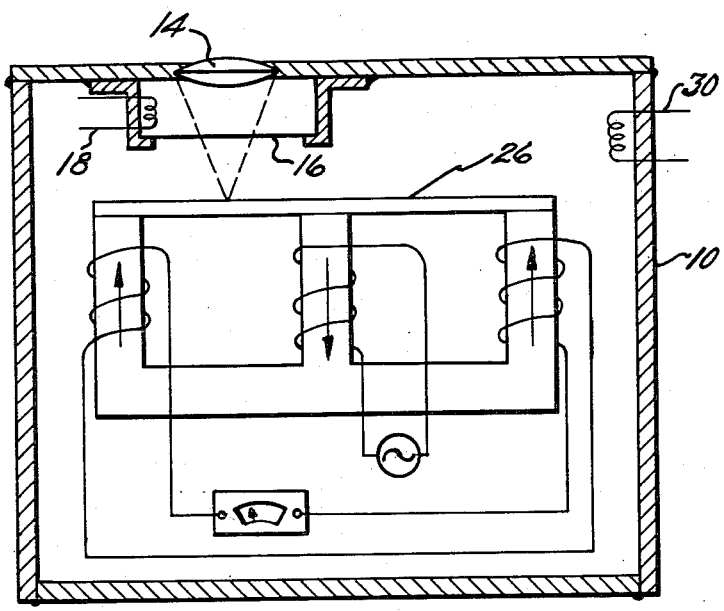
FIGURE 3 is a schematic representation of a detector utilizing a bridge type transformer circuit for detecting infra-red radiation.

FIGURE 3 utilizes the sheet of ferromagnetic material on which the energy from an infra-red source is made to impinge; however, the sensing means comprises a magnetic bridge circuit. A series of coils are placed around each of the three legs of a transformer. The center leg has a A.C. source applied thereto while the two outer legs are connected in series with each other and with an indicating means such as a current indicating device. The magnetic flux induced in the coils are shown by arrowed lines to produce bucking currents in the outer coils; however, a change in the magnetic flux of the permalloy between the center and either one of the outer legs would produce an imbalance which would produce a signal caused by the unequal currents in the outer coils. In order to utilize this type of detector as a point source detector a focus mirror (not shown) which is connected to a system indicating the direction to which the mirror is pointed may be utilized to scan and reflect energy onto one section of the permalloy sheet, and, when an indication in the sensing means is shown, the coordinates for locating the source for infra-red energy may be determined.

Although the invention has been described with reference to particular embodiments, it will be understood to those skilled in the art that the invention is capable of a variety of alternative embodiments within the spirit and scope of the appended claims.

I claim:
1. An infra-red detector comprising means to form an infra-red image on a thin sheet of material which is substantially saturated with magnetic flux, said sheet of material having the property of varying its magnetic permeability with temperature, means for maintaining said sheet of material at substantially the curie point such that the formation of the image on said sheet raises the temperature of the imaged portion above said curie point to change the local magnetic flux external to said sheet at said imaged portion, and means for reproducing the magnetic variations on said sheet thereby reproducing the infra-red image.

2. An infra-red detector comprising means to form an infra-red image on a thin sheet of material which is substantially saturated with magnetic flux, said sheet of material having the property of varying its magnetic permeability with temperature, means for maintaining said sheet of material at substantially the curie point such that the formation of the image on said sheet raises the temperature of the imaged portion above said curie point to change the local magnetic flux external to said sheet at said imaged portion, and means for reproducing the magnetic variations in the form of a light output which reproduces said image.

3. Means for reproducing an infra-red image comprising a sheet of material having the property of varying its magnetic permeability with temperature, means for saturating said sheet with magnetic flux, heating means for maintaining said sheet at substantially the curie point, and means for focusing said infra-red image on said sheet such that the attendant temperature rise produces a change in magnetic flux external to said sheet at the imaged portion, and means responsive to said change in magnetic flux for indicating said change, said last-mentioned means comprising a thermionic emitter coating on said sheet which emits magnetically modulated electrons in accordance with said change in magnetic flux.

4. Means as defined in claim 3 wherein said sheet is of permalloy and said thermionic emitter coating is caesium on oxygen.

5. Means as defined in claim 3 including a fluorescent screen located to receive said magnetically modulated electrons.

6. Means as defined in claim 3 including means for receiving and displaying the pattern of said magnetically modulated electrons.

7. Means for reproducing an infra-red image comprising a sheet of material having the property of varying its magnetic permeability with temperature, means for saturating said sheet with magnetic flux, heating means for maintaining said sheet at substantially the curie point, and means for focusing said infra-red image on said sheet such that the attendant temperature rise produces a change in magnetic flux external to said sheet at the imaged portion, and means responsive to said change in magnetic flux for indicating said change, said last-mentioned means comprising a means for scanning said sheet and means for displaying the electron pattern resulting from the magnetic effect of said sheet on the scanning electrons.

8. Means as defined in claim 7 wherein said sheet is of gadolinium.

References Cited in the file of this patent

UNITED STATES PATENTS

| | | |
|---|---|---|
| 2,120,916 | Bitner | June 14, 1938 |
| 2,222,425 | Wehe | Nov. 19, 1940 |
| 2,234,328 | Wolff | Mar. 11, 1941 |
| 2,932,743 | Atwood | Apr. 12, 1960 |
| 2,953,688 | Maxwell et al. | June 21, 1960 |
| 2,967,961 | Heil | Jan. 10, 1961 |